United States Patent
Lee et al.

(10) Patent No.: US 10,225,759 B2
(45) Date of Patent: Mar. 5, 2019

(54) METHOD FOR RECEIVING REFERENCE SIGNAL IN WIRELESS COMMUNICATION SYSTEM, AND APPARATUS FOR THE METHOD

(71) Applicant: LG ELECTRONICS INC., Seoul (KR)

(72) Inventors: Hyunho Lee, Seoul (KR); Hanjun Park, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/545,108

(22) PCT Filed: Feb. 5, 2016

(86) PCT No.: PCT/KR2016/001339
§ 371 (c)(1),
(2) Date: Jul. 20, 2017

(87) PCT Pub. No.: WO2016/129908
PCT Pub. Date: Aug. 18, 2016

(65) Prior Publication Data
US 2018/0007576 A1    Jan. 4, 2018

Related U.S. Application Data

(60) Provisional application No. 62/115,647, filed on Feb. 13, 2015, provisional application No. 62/143,825, (Continued)

(51) Int. Cl.
*H04W 24/10* (2009.01)
*H04W 64/00* (2009.01)
(Continued)

(52) U.S. Cl.
CPC ............. *H04W 24/10* (2013.01); *H04L 5/001* (2013.01); *H04L 5/0035* (2013.01);
(Continued)

(58) Field of Classification Search
CPC . H04W 24/10; H04W 64/00; H04W 72/0446; H04L 5/001; H04L 5/0035; H04L 5/0053
See application file for complete search history.

(56) References Cited

U.S. PATENT DOCUMENTS

| | | | |
|---|---|---|---|
| 2011/0117926 A1* | 5/2011 | Hwang | H04W 64/00 455/456.1 |
| 2012/0122472 A1* | 5/2012 | Krishnamurthy | H04L 5/0053 455/456.1 |

(Continued)

*Primary Examiner* — Mohammad S Adhami
*Assistant Examiner* — Weibin Huang
(74) *Attorney, Agent, or Firm* — Dentons US LLP

(57) ABSTRACT

Disclosed is a method for receiving a reference signal for determining location by means of one or more unlicensed band cells in a wireless communication system, and the method, carried out by a terminal, may comprise the steps of: receiving configuration information associated with a positioning reference signal (PRS) transmitted by means of one or more unlicensed band cells, the PRS-related configuration information comprising information regarding the subframe from which the PRS is transmitted; receiving and measuring the PRS by means of the PRS-related configuration information; and reporting the results of the PRS measurement to a serving base station.

11 Claims, 9 Drawing Sheets

Related U.S. Application Data filed on Apr. 7, 2015, provisional application No. 62/144,984, filed on Apr. 9, 2015.

(51) Int. Cl.
| | |
|---|---|
| *H04W 72/04* | (2009.01) |
| *H04L 5/00* | (2006.01) |
| *H04W 16/14* | (2009.01) |
| *H04W 74/08* | (2009.01) |
| *H04W 88/02* | (2009.01) |

(52) U.S. Cl.
CPC .......... *H04L 5/0053* (2013.01); *H04W 64/00* (2013.01); *H04W 72/0446* (2013.01); *H04L 5/005* (2013.01); *H04L 5/0051* (2013.01); *H04W 16/14* (2013.01); *H04W 74/0808* (2013.01); *H04W 88/02* (2013.01)

(56) References Cited

U.S. PATENT DOCUMENTS

| | | | |
|---|---|---|---|
| 2013/0016221 A1* | 1/2013 | Charbit | H04W 16/14 348/180 |
| 2013/0273905 A1* | 10/2013 | Krishnamurthy | G01S 5/0221 455/423 |
| 2014/0171097 A1* | 6/2014 | Fischer | H04W 4/02 455/456.1 |
| 2015/0263837 A1* | 9/2015 | Patel | H04L 27/0006 370/329 |
| 2016/0223641 A1* | 8/2016 | Cheng | G01S 5/0036 |
| 2018/0054792 A1* | 2/2018 | Lee | H04W 64/00 |

\* cited by examiner

METHOD FOR RECEIVING REFERENCE SIGNAL IN WIRELESS COMMUNICATION SYSTEM, AND APPARATUS FOR THE METHOD

This application is a National Stage of International Application No. PCT/KR2016/001339, filed Feb. 5, 2016 which claims the benefit of U.S. Provisional Application No. 62/115,647, filed on Feb. 13, 2015, 62/143,825, filed Apr. 7, 2015, and 62/144,984, filed Apr. 9, 2015, the disclosures of which are incorporated herein by reference in their entirety.

TECHNICAL FIELD

The present invention relates to a wireless communication system, and more particularly, to a method for receiving a reference signal in a wireless communication system and an apparatus for the method.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE

Technical Problem

An object of the present invention is to provide a method for receiving a reference signal in a wireless communication system and an operation related therewith.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In a method for receiving a positioning reference signal through one or more unlicensed band cells in a wireless communication system according to one embodiment of the present invention, the method is carried out by a terminal and comprises receiving positioning reference signal (PRS) related configuration information transmitted through the one or more unlicensed band cells, the PRS related configuration information including information on a subframe in which the PRS is transmitted; receiving and measuring the PRS by using the PRS related configuration information; and reporting a measurement result of the PRS to a serving base station.

Additionally or alternatively, the information on a subframe in which the PRS is transmitted may indicate at least one subframe which belongs to a resource period obtained in a corresponding unlicensed band cell.

Additionally or alternatively, the information on a subframe in which the PRS is transmitted may indicate a period or offset value of a specific subframe.

Additionally or alternatively, the information on a subframe in which the PRS is transmitted may indicate a period or offset value of a subframe of a licensed band cell to which the PRS is transmitted.

Additionally or alternatively, the PRS may be transmitted in the subframe which belongs to a resource period obtained in a corresponding unlicensed band cell, among the indicated subframes.

Additionally or alternatively, the method may further comprise transmitting a PRS transmission request through the one or more unlicensed band cells to the serving base station.

Additionally or alternatively, the PRS related configuration information may include information on a measurement window related to the PRS through the one or more unlicensed band cells.

Additionally or alternatively, the information on the measurement window may be configured differently in a unit of each unlicensed band cell or in a unit of a plurality of unlicensed band cells.

Additionally or alternatively, the PRS related configuration information may include information on an unlicensed band cell to which the PRS is transmitted.

Additionally or alternatively, the method may further comprise receiving a trigger of a transmission of an aperiodic uplink reference signal for positioning in one or more unlicensed band cells from the serving base station.

Additionally or alternatively, the method may include performing channel sensing in the one or more unlicensed band cells when the trigger is received, and transmitting the aperiodic uplink reference signal for a resource period obtained through the channel sensing.

Additionally or alternatively, the method may further comprise the step of receiving transmission related configuration of the aperiodic uplink reference signal from the serving eNB.

A terminal configured to receive a positioning reference signal through one or more unlicensed band cells in a wireless communication system according to another embodiment of the present invention comprises a radio frequency (RF) unit; and a processor configured to control the RF unit, wherein the processor is configured to receive positioning reference signal (PRS) related configuration information transmitted through the one or more unlicensed band cells, the PRS related configuration information including information on a subframe in which the PRS is transmitted, receive and measure the PRS by using the PRS related configuration information, and report a measurement result of the PRS to a serving eNB.

The above technical solutions are merely some parts of the embodiments of the present invention and various embodiments into which the technical features of the present invention are incorporated can be derived and understood by persons skilled in the art from the following detailed description of the present invention.

Advantageous Effects

According to one embodiment of the present invention, reception of a reference signal and measurement of the reference signal can efficiently be performed in a wireless communication system.

It will be appreciated by persons skilled in the art that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Figure 1:
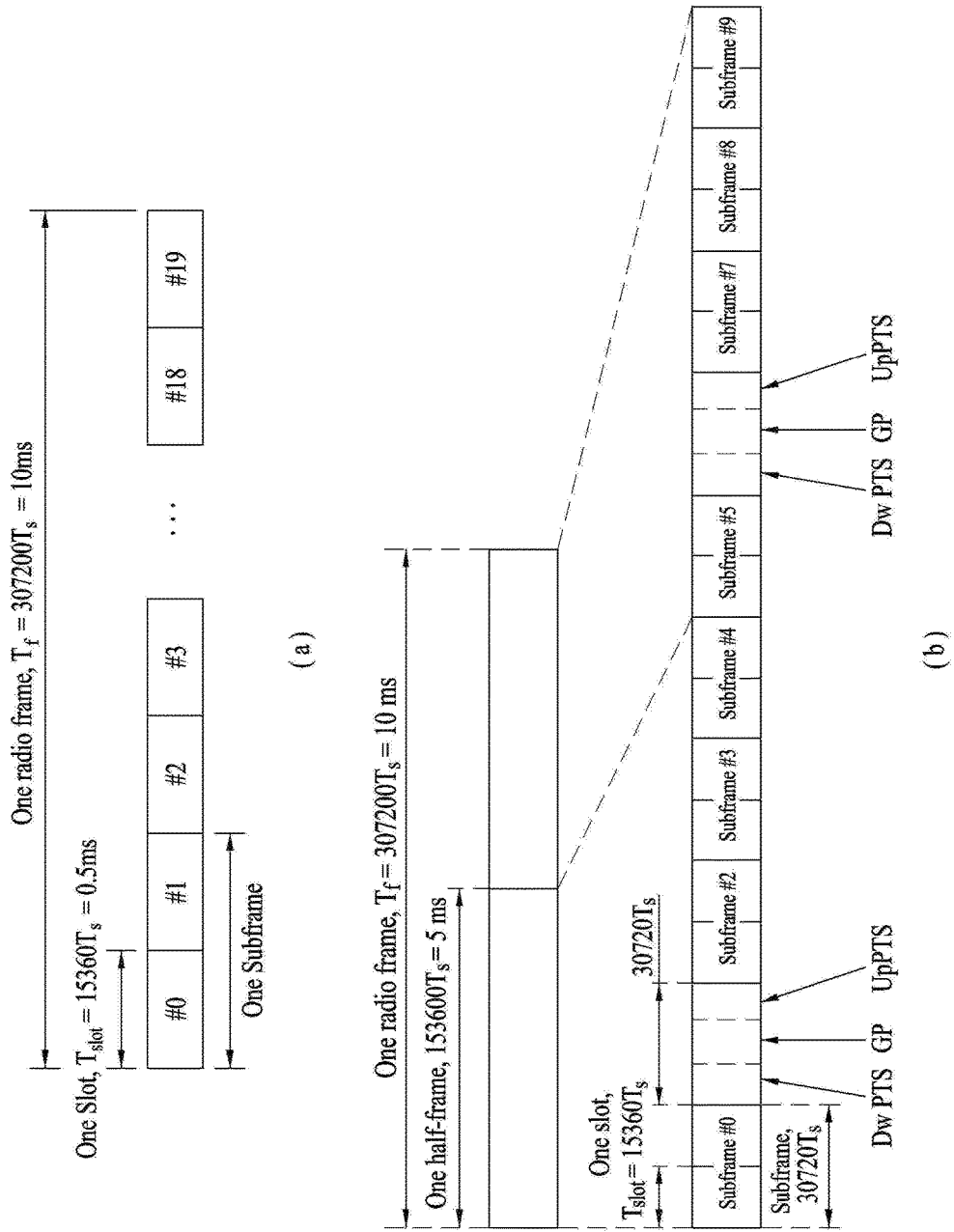
FIG. 1 is diagram illustrating an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlike a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/ downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | \multicolumn{10}{c}{Subframe number} |
| | | 0 | 1 | 2 | 3 | 4 | 5 | 6 | 7 | 8 | 9 |
| --- | --- | --- | --- | --- | --- | --- | --- | --- | --- | --- | --- |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Figure 2:
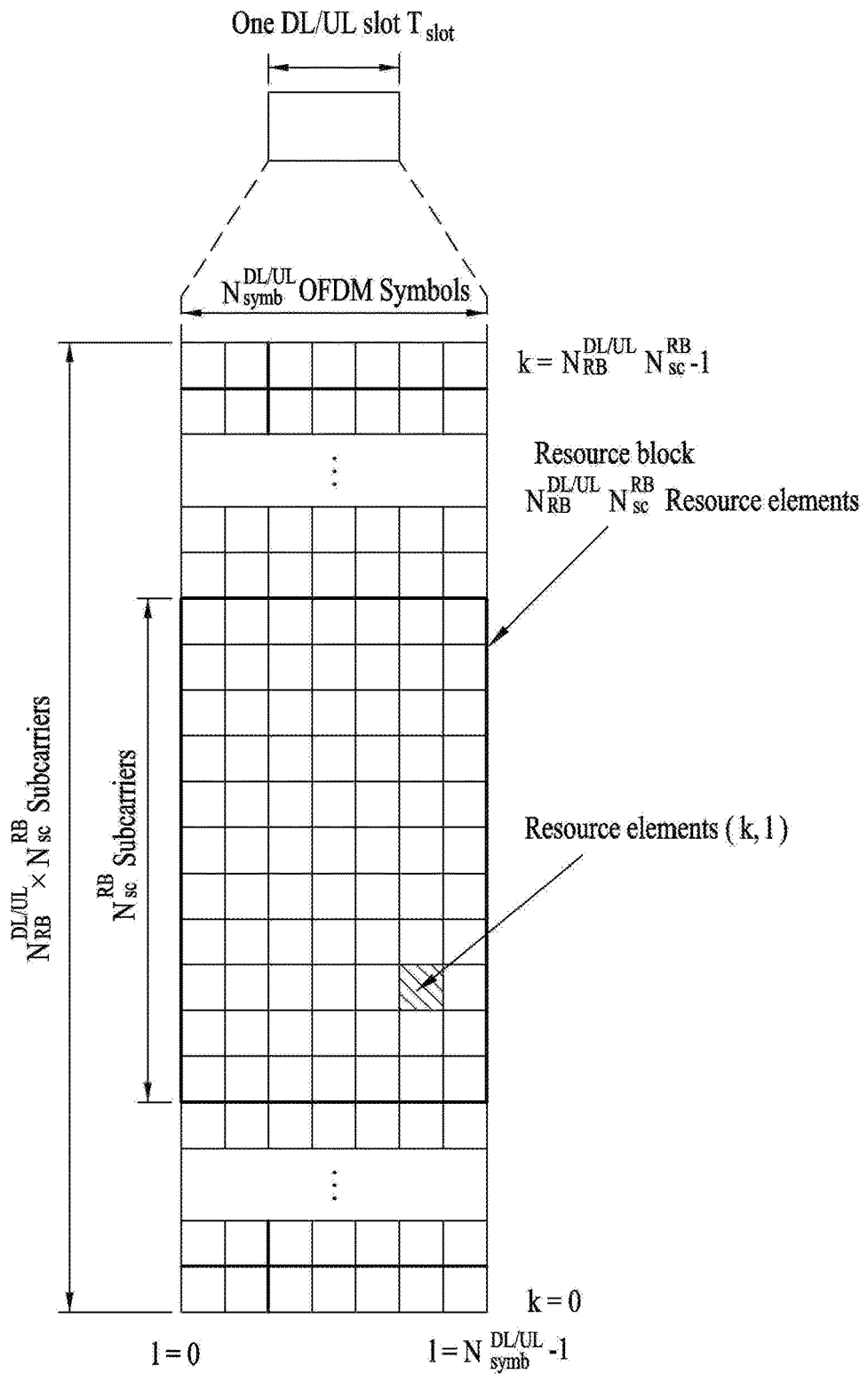
FIG. 2 is diagram illustrating an example of a downlink/uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
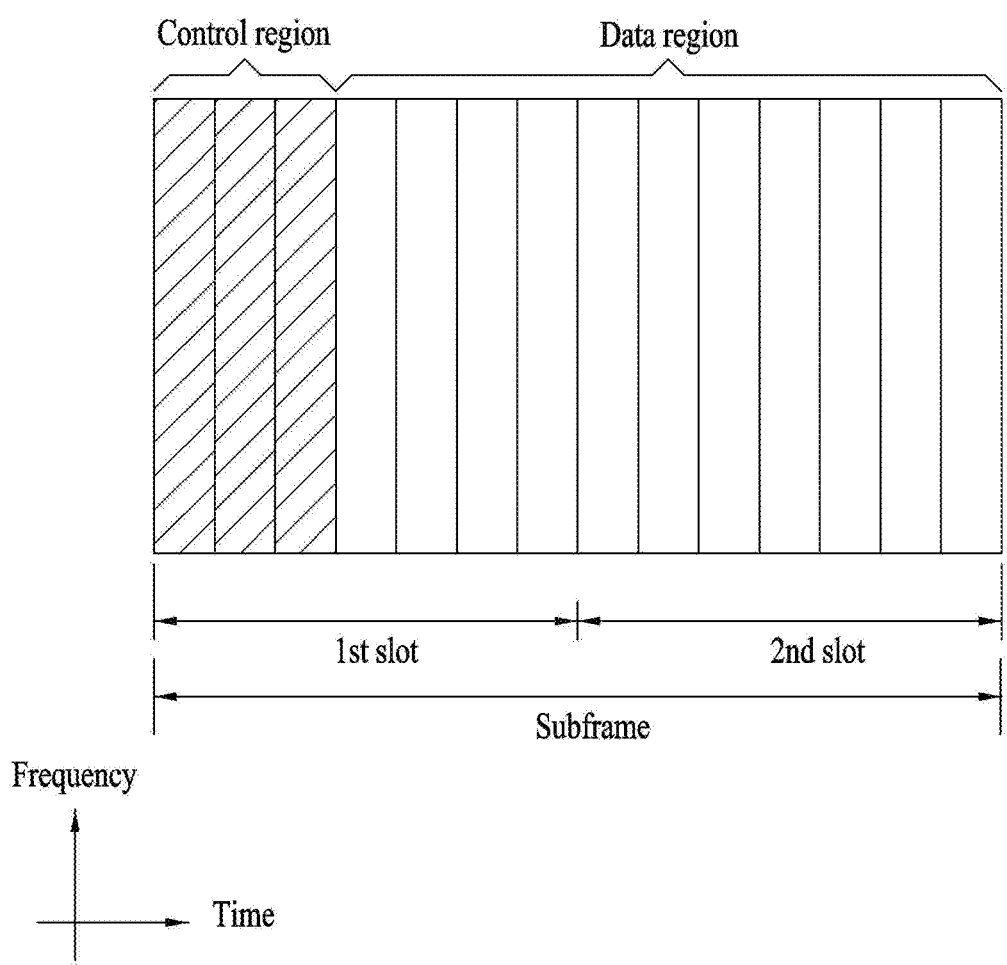
FIG. 3 is diagram illustrating an example of a downlink (DL) subframe structure used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Type | Search Space Aggregation Level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
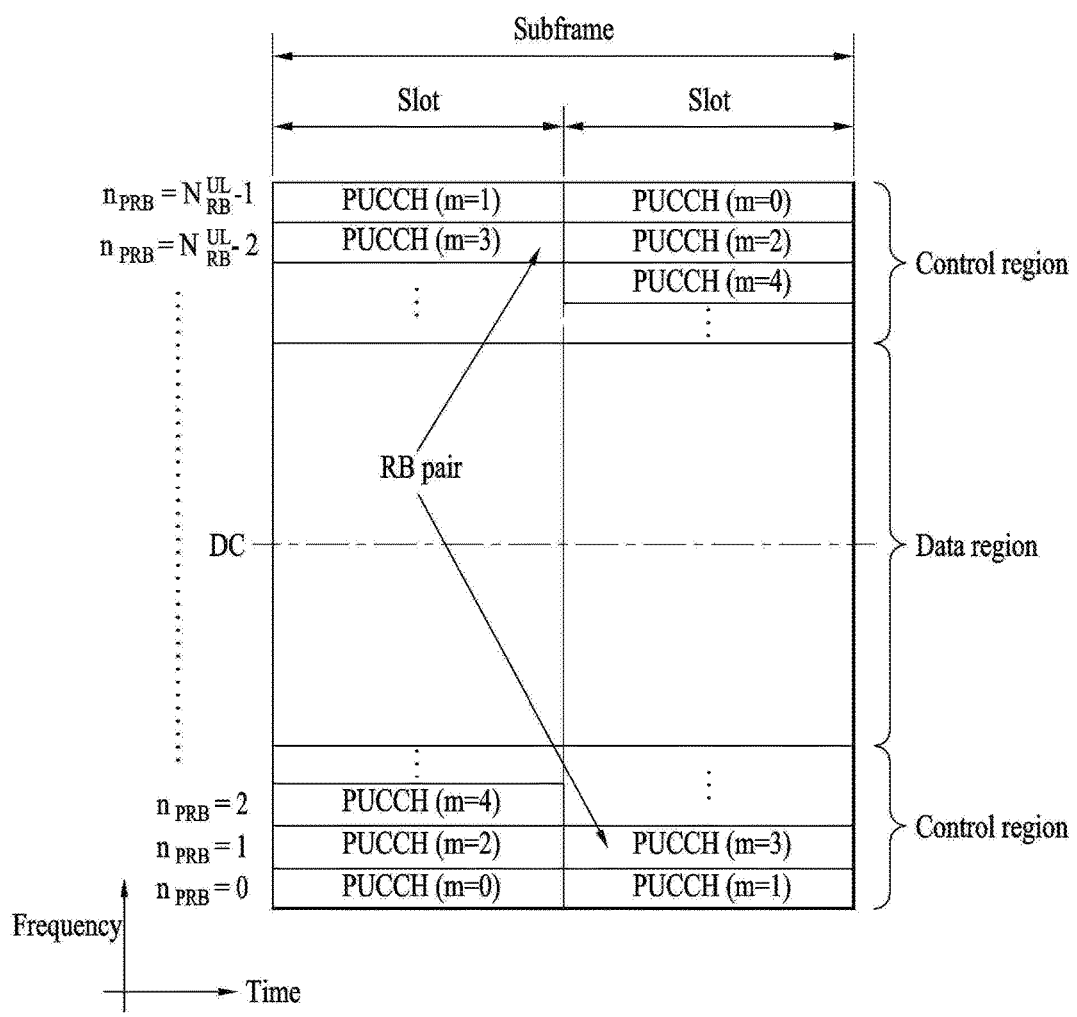
FIG. 4 is diagram illustrating an example of an uplink (UL) subframe structure used in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Generally, in a cellular communication system, various methods for acquiring position information of a UE in a network are used. Representatively, a positioning scheme based on OTDOA (observed time difference of arrival) exists in the LTE system. According to the positioning scheme, the UE may be configured to receive PRS (positioning reference signal) transmission related information of eNBs from a higher layer signal, and may transmit a reference signal time difference (RSTD) which is a difference between a reception time of a PRS transmitted from a reference eNB and a reception time of a PRS transmitted from a neighboring eNB to a eNB or network by measuring PRS transmitted from cells in the periphery of the UE, and the network calculates a position of the UE by using RSTD and other information. In addition, other schemes such as an A-GNSS (Assisted Global Navigation Satellite System) positioning scheme, an E-CID (Enhanced Cell-ID) scheme, and a UTDOA (Uplink Time Difference of Arrival) exist, and various location-based services (for example, advertisements, position tracking, emergency communication means, etc.) may be used based on these positioning schemes.

[LTE Positioning Protocol]

In the LTE system, an LPP (LTE positioning protocol) has been defined to the OTDOA scheme, and notifies the UE of OTDOA-ProvideAssistanceData having the following configuration through IE (information element).

```
-- ASN1START
OTDOA-ProvideAssistanceData ::= SEQUENCE {
    otdoa-ReferenceCellInfo      OTDOA-ReferenceCellInfo OPTIONAL, -- Need ON
    otdoa-NeighbourCellInfo      OTDOA-NeighbourCellInfoList OPTIONAL, -- Need ON
    otdoa-Error   OTDOA-Error OPTIONAL,   -- Need ON
    ...
}
-- ASN1STOP
```

In this case, OTDOA-ReferenceCellInfo means a cell which is a reference of RSTD measurement, and is configured as follows.

```
-- ASN1START
OTDOA-ReferenceCellInfo ::= SEQUENCE {
    physCellId      INTEGER (0..503),
    cellGlobalId    ECGI           OPTIONAL,  -- Need ON
    earfcnRef       ARFCN-ValueEUTRA           OPTIONAL, --Cond NotSameAsServ0
    antennaPortConfig        ENUMERATED {ports1-or-2, ports4, ... } OPTIONAL,     -- Cond NotSameAsServ1
    cpLength ENUMERATED { normal, extended, ... },
    prsInfo PRS-Info            OPTIONAL,   -- Cond PRS
    ...,
    [[ earfcnRef-v9a0           ARFCN-ValueEUTRA-v9a0 OPTIONAL  --  Cond NotSameAsServ2
    ]]
}
-- ASN1STOP
```

Meanwhile, OTDOA-NeighbourCellInfo means cells (for example, eNB or TP) which is a target for RSTD measurement, and may include information on maximum 24 neighboring cells per frequency layer with respect to maximum three frequency layers. That is, OTDOA-NeighbourCellInfo may notify the UE of information on a total of 3*24=72 cells.

```
-- ASN1START
    OTDOA-NeighbourCellInfoList          ::=          SEQUENCE    (SIZE
(1..maxFreqLayers)) OF OTDOA-NeighbourFreqInfo
    OTDOA-NeighbourFreqInfo ::= SEQUENCE (SIZE (1..24)) OF OTDOA-
NeighbourCellInfoElement
    OTDOA-NeighbourCellInfoElement ::= SEQUENCE {
    physCellId        INTEGER (0..503),
    cellGlobalId      ECGI    OPTIONAL,         -- Need ON
    earfcn ARFCN-ValueEUTRA                     OPTIONAL,            --       Cond
NotSameAsRef0
    cpLength          ENUMERATED {normal, extended, ...}
OPTIONAL,         -- Cond NotSameAsRef1
    prsInfo           PRS-Info            OPTIONAL,            --       Cond
NotSameAsRef2
    antennaPortConfig       ENUMERATED {ports-1-or-2, ports-4, ...}
OPTIONAL,         -- Cond NotsameAsRef3
    slotNumberOffset        INTEGER (0..19)          OPTIONAL,      --       Cond
NotSameAsRef4
    prs-SubframeOffset      INTEGER (0..1279)        OPTIONAL,      --       Cond
InterFreq
    expectedRSTD            INTEGER (0..16383),
    expectedRSTD-Uncertainty INTEGER (0..1023),
    ...,
    [[ earfcn-v9a0         ARFCN-ValueEUTRA-v9a0 OPTIONAL           --       Cond
NotSameAsRef5
    ]]
    }
    maxFreqLayers           INTEGER ::= 3
-- ASN1STOP
```

In this case, PRS-Info which is IE included in OTDOA-ReferenceCellInfo and OTDOA-NeighbourCellInfo has PRS information, and is specifically configured, as follows, as PRS Bandwidth, PRS Configuration Index (IPRS), Number of Consecutive Downlink Subframes, and PRS Muting Information.

```
PRS-Info ::= SEQUENCE {
prs-Bandwidth      ENUMERATED { n6, n15, n25, n50, n75, n100, ... },
prs-ConfigurationIndex          INTEGER (0..4095),
numDL-Frames       ENUMERATED {sf-1, sf-2, sf-4, sf-6, ...},
...,
prs-MutingInfo-r9 CHOICE {
po2-r9     BIT STRING (SIZE(2)),
po4-r9     BIT STRING (SIZE(4)),
po8-r9     BIT STRING (SIZE(8)),
po16-r9    BIT STRING (SIZE(16)),
...
} OPTIONAL     -- Need OP
}
-- ASN1STOP
```

Figure 5:
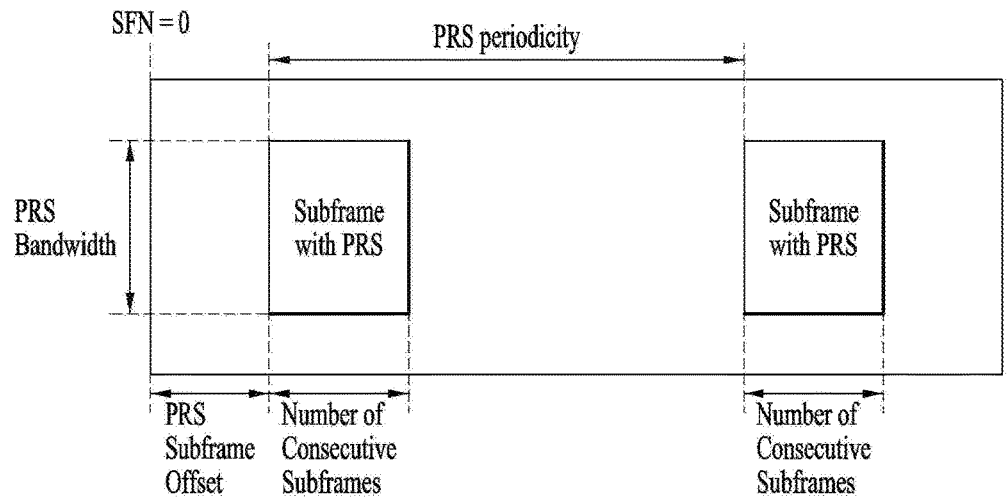
FIG. 5 is a diagram illustrating a PRS transmission structure.

FIG. 5 illustrates a PRS transmission structure according to the above parameters.

At this time, PRS Periodicity and PRS Subframe Offset are determined in accordance with a value of PRS Configuration Index (IPRS), and their correlation is as follows.

TABLE 5

| PRS Configuration Index ($I_{PRS}$) | PRS Periodicity (subframes) | PRS Subframe Offset (subframes) |
|---|---|---|
| 0-159 | 160 | $I_{PRS}$ |
| 160-479 | 320 | $I_{PRS}$-160 |

TABLE 5-continued

| PRS Configuration Index ($I_{PRS}$) | PRS Periodicity (subframes) | PRS Subframe Offset (subframes) |
|---|---|---|
| 480-1119 | 640 | $I_{PRS}$-480 |
| 1120-23399 | 1280 | $I_{PRS}$-1120 |

[PRS (Positioning Reference Signal)]

Figure 6:
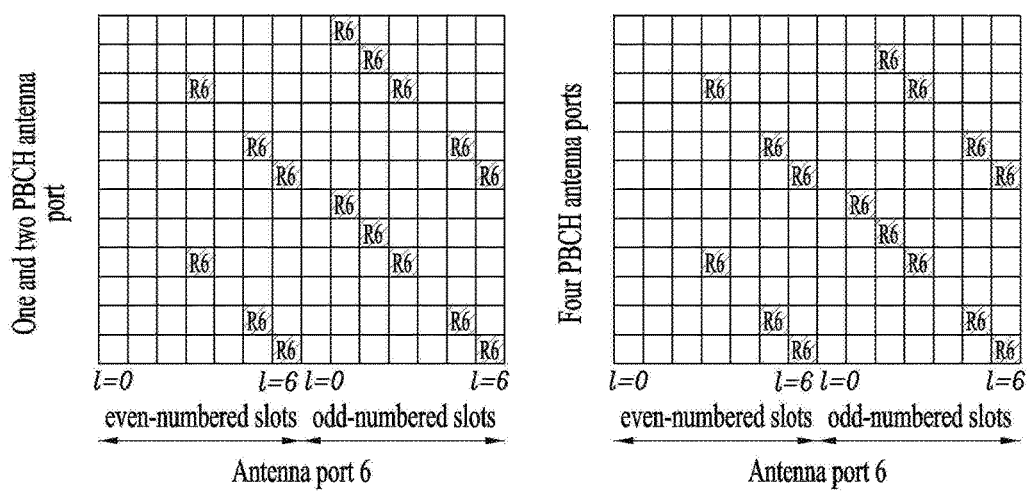
FIGS. 6 and 7 are diagrams illustrating RE mapping of a PRS (positioning reference signal)
Figure 7:
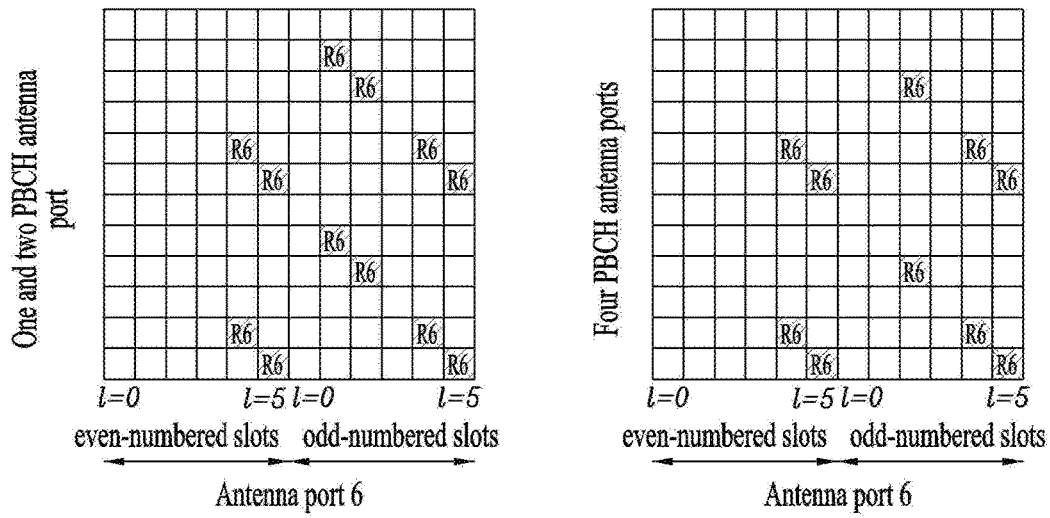

The PRS has a transmission occasion, that is, a positioning occasion at a period of 160, 320, 640, or 1280 ms, and may be transmitted for N DL subframes consecutive for the positioning occasion. In this case, N may have a value of 1, 2, 4 or 6. Although the PRS may be transmitted substantially at the positioning occasion, the PRS may be muted for inter-cell interference control cooperation. Information on such PRS muting is signaled to the UE as prs-MutingInfo. A transmission bandwidth of the PRS may be configured independently unlike a system bandwidth of a serving eNB, and is transmitted to a frequency band of 6, 15, 25, 50, 75 or 100 resource blocks (RBs). Transmission sequences of the PRS are generated by initializing a pseudo-random sequence generator for every OFDM symbol using a function of a slot index, an OFDM symbol index, a cyclic prefix (CP) type, and a cell ID. The generated transmission sequences of the PRS are mapped to resource elements (REs) depending on a normal CP or an extended CP as shown in FIG. 6 (normal CP) and FIG. 7 (extended CP). A position of the mapped REs may be shifted on the frequency axis, and a shift value is determined by a cell ID. The positions of the REs for transmission of the PRS shown in FIGS. 6 and 7 correspond to the case that the frequency shift is 0.

The UE receives designated configuration information on a list of PRSs to be searched from a position management server of a network to measure PRSs. The corresponding information includes PRS configuration information of a reference cell and PRS configuration information of neighboring cells. The configuration information of each PRS includes a generation cycle and offset of a positioning occasion, and the number of continuous DL subframes constituting one positioning occasion, cell ID used for generation of PRS sequences, a CP type, the number of CRS antenna ports considered at the time of PRS mapping, etc. In addition, the PRS configuration information of the neighboring cells includes a slot offset and a subframe offset of the neighboring cells and the reference cell, an expected RSTD, and a level of uncertainty of the expected RSTD to support determination of the UE when the UE determines a timing point and a level of time window used to search for the PRS to detect the PRS transmitted from the neighboring cell.

Meanwhile, the RSTD refers to a relative timing difference between an adjacent or neighboring cell j and a reference cell i. In other words, the RSTD may be expressed by $T_{subframeRxj} - T_{subframeRxi}$, wherein $T_{subframeRxj}$ refers to a timing point at which a UE starts to receive a specific subframe from the neighboring cell j, and $T_{subframeRxi}$ refers to a timing point at which a UE starts to receive a subframe, which is closest to the specific subframe received from the neighboring cell j in terms of time and corresponds to the specific subframe, from the reference cell i. A reference point for an observed subframe time difference is an antenna connector of the UE.

Although the aforementioned positioning schemes of the related art are already supported by the 3GPP UTRA and E-UTRAN standard (for example, (LTE Rel-9), higher accuracy is recently required for an in-building positioning scheme. That is, although the positioning schemes of the related art may commonly be applied to outdoor/indoor environments, in case of E-CID scheme, general positioning accuracy is known as 150 m in a non-LOS (NLOS) environment and as 50 m in a LOS environment. Also, the OTDOA scheme based on the PRS has a limit in a positioning error, which may exceed 100 m, due to an eNB synchronization error, a multipath propagation error, a quantization error in RSTD measurement of a UE, and a timing offset estimation error. Also, since a GNSS receiver is required in case of the A-GNSS scheme, the A-GNSS scheme has a limit in complexity and battery consumption, and has a restriction in using in-building positioning.

[LTE in Unlicensed Band (LTE-U)]

As more communication devices require greater communication capacity, a future-generation wireless communication system seeks to efficiently utilize a limited frequency band. In this context, in a cellular communication system such as an LTE system, a method for using an unlicensed band of 2.4 GHz used by the legacy WiFi system or an unlicensed band of 5 GHz newly issued in traffic offloading is under consideration. Since it is basically assumed that wireless transmission and reception is performed in an unlicensed band through contention between communication nodes, each communication node is requested to make sure that another communication node is not transmitting a signal in the unlicensed band, by performing channel sensing before transmitting a signal. This operation is called clear channel assessment (CCA). An eNB or UE of the LTE system should perform CCA to perform signal transmission in the unlicensed band (for convenience, referred to as LTE-U band). Also, when the eNB or the UE of the LTE system transmits a signal, nodes conforming to other communication standards such as Wi-Fi should not interfere with the eNB or the UE by performing CCA. For example, a Wi-Fi standard (801.11ac) regulates that a CCA threshold is −62 dBm for a non-Wi-Fi signal and −82 dBm for a Wi-Fi signal. This means that upon receipt of a non-Wi-Fi signal with power equal to or higher than −62 dBm, a station (STA) or an access point (AP) does not transmit a signal in order not to cause interference. Particularly, in the WiFi system, the STA or the AP may perform CCA if a signal of a CCA threshold or more is not detected for a 4 us or more, and may perform signal transmission.

Figure 8:
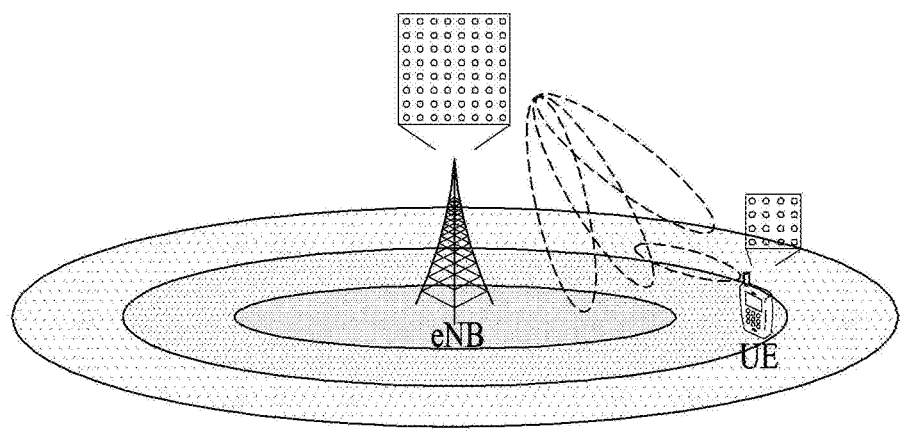
FIG. 8 is a diagram illustrating a structure of carrier aggregation of an LTE band which is a licensed band and an unlicensed band.

The present specification considers a method for configuring a resource period in a cell/carrier in which an available resource period is acquired or configured aperiodically or discontinuously in the same manner as an unlicensed band where exclusive usage of a specific system is not assured, and a UE operation accompanied with the method. For example, the eNB may transmit a signal to the UE under a carrier aggregation status of an LTE-band which is a licensed band and an unlicensed band, as shown in FIG. 8. In the following description, for convenience of description of the suggested method, it is assumed that the UE performs wireless communication in each of the licensed band and the unlicensed band through two component carriers (CC). In this case, a carrier of the licensed band may be construed as a primary component carrier (PCC or PCell) while a carrier of the unlicensed band may be construed as a secondary component carrier (SCC or SCell). However, the suggested methods of the present specification may be applied to even the status that a plurality of licensed bands and a plurality of unlicensed bands are used by a carrier aggregation scheme. Also, the suggested methods of the present invention may be applied to even the case that signal transmission and reception between an eNB and a UE is performed in the unlicensed band only. Also, the suggested methods of the present invention may be applied to the other systems as well as the 3GPP LTE system.

In order that the eNB and the UE perform communication in the LTE-U band, since the corresponding band corresponds to an unlicensed spectrum, the corresponding band should be reserved/acquired for a specific time duration through contention with other communication (e.g., WiFi) system irrespective of the LTE. Hereinafter, the time duration reserved/acquired for communication in the LTE-U band will be referred to as a reserved resource period (RRP). Various methods may exist to acquire the RRP. Typically, a method for transmitting a specific reservation signal to allow other communication system devices such as WiFi to recognize that a corresponding radio channel is busy or continuously transmitting a reference signal (RS) and a data signal to transmit a signal of a specific power level or more without disconnection for a reserved resource period (RRP) is available. In this way, if the eNB previously determines the RRP for reserving the LTE-U band, the eNB previously notifies the UE of the determined RRP to allow the UE to maintain a communication transmission/reception link for the corresponding indicated RRP. As a method for notifying the UE of corresponding RRP information, the eNB may indicate corresponding RRP time duration information through another CC (e.g., LTE-A band) linked in the form of carrier aggregation.

As another example of an unlicensed band operation operating in a contention based random access mode, the eNB may perform carrier sensing (CS) before performing data transmission and reception. The eNB checks whether a current channel state of the SCell is busy or idle. If it is determined that the current channel state is idle, the eNB may transmit a scheduling grant through (E)PDCCH of the PCell (i.e., cross carrier scheduling, CCS) or through PDCCH of the SCell and attempt data transmission and reception. At this time, for example, an RRP comprised of M consecutive subframes (SFs) may be configured. In this case, a value of M and usage of the M subframes may previously be notified from the eNB to the UE through higher layer signaling (using PCell) or through a physical control/data channel. A start point of the RRP may be configured periodically (or semi-statically) by higher layer signaling. Alternatively, when the RRP start point is desired to be set to SF#n, the start point of the RRP may be designated through physical layer signaling at SF#n or SF#(n−k).

Generally, in a cellular communication system, various methods for acquiring position information of a UE in a network are used. Representatively, a positioning scheme based on OTDOA (observed time difference of arrival) exists in the LTE system. According to the positioning scheme, the UE may be configured to receive PRS (positioning reference signal) transmission related configuration information of eNB from a higher layer signal, and may transmit position related information to a network by measuring PRS transmitted from cells in the periphery of the UE in accordance with a positioning scheme such as OTDOA (Observed Time Difference Of Arrival). In addition, other schemes such as an A-GNSS (Assisted Global Navigation Satellite System) positioning scheme, an E-CID (Enhanced Cell-ID) scheme, and a UTDOA (Uplink Time Difference of Arrival) exist, and various location-based services (for example, advertisements, position tracking, emergency communication means, etc.) may be used based on these positioning schemes.

Although the aforementioned positioning schemes of the related art are already supported by the 3GPP UTRA and E-UTRAN standard (for example, LTE Rel-9), an advanced positioning scheme of higher accuracy is recently required for in-building positioning. That is, although the positioning schemes of the related art may commonly be applied to outdoor/indoor environments, in case of E-CID scheme, general positioning accuracy is known as 150 m in a non-LOS (NLOS) environment and as 50 m in a LOS environment. Also, the OTDOA scheme based on the PRS has a limit in a positioning error, which may exceed 100 m, due to an eNB synchronization error, a multipath propagation error, a quantization error in RSTD measurement of a UE, and a timing offset estimation error. Also, since a GNSS receiver is required in case of the A-GNSS scheme, the A-GNSS scheme has a limit in complexity and battery consumption, and has a restriction in using in-building positioning.

In the present invention, a cellular network basically transmits a specific pilot signal (for example, specific reference signal type identifiable separately per eNB/TP (transmission point)) to the UE, and the UE calculates a positioning related estimation value (for example, OTDOA and RSTD estimation value) based on a specific positioning scheme by measuring each pilot signal and then reports the calculated value to the eNB, whereby a method for calculating position information of the corresponding UE at an eNB terminal is considered.

If the PRS is transmitted using a broader bandwidth, RSTD measurement accuracy of the UE may be enhanced. This is caused by duality of frequency and time domains. Resolution of the time domain becomes the same value of an inverse value of the frequency domain, whereby a time unit that may be measured by the UE may be more specific when a signal of a broader frequency band is transmitted. Therefore, the PRS may be transmitted by aggregation of the unlicensed band having a broad bandwidth in the same cell by the CA scheme, and if the UE can use this, it is expected that the UE may estimate RSTD of higher resolution. Alternatively, even though the PRS is not transmitted using the licensed band the unlicensed band at the same time, the PRS may be transmitted occasionally in the unlicensed band of a relatively broad frequency unit (that is, broad bandwidth), and if the UE can use this, it is expected that measurement accuracy of the UE may be enhanced.

In the present invention, a CA (carrier aggregation) status between PCell operating in the existing licensed band and SCell operating in accordance with the LTE-U mode is considered. In this case, for convenience of description, the LTE-U based SCell will be referred to as "UCell", and a resource period acquired/configured aperiodically in the corresponding UCell will be referred to as "RRP (Reserved Resource Period)". Also, the existing licensed band based cell will be referred to as "LCell". As another example, a rule may be defined such that PDSCH related control information channel (or PUSCH related control information channel transmitted on UL SF (that is, subframe designated for UL) of RRP)) transmitted on DL SF (Downlink Subframe) (that is, subframe designated for DL) of the RRP may be configured to be transmitted from the PCell (that is, referred to as "CCS (Cross Carrier Scheduling)") or configured to be transmitted from the same UCell (that is, referred to as "SFS (Self-Scheduling)"). As another example, PDSCH reception related downlink control information channel on the RRP may be implemented in such a manner that one downlink control information channel schedules one PDSCH received at the same (or specific) time (that is, "SSFS (Single SubFrame Scheduling)", or may be implemented in such a manner that one downlink control information channel schedules a previously defined (or signaled) number of PDSCHs received at another time as well as one PDSCH received at the same (or specific) time (that is, "MSFS (Multi SubFrame Scheduling)".

First Alternative

In accordance with a detailed embodiment of the present invention, if a plurality of licensed bands (or single licensed band) and a plurality of unlicensed bands (or single unlicensed band) are used by a carrier aggregation scheme, it may be configured such that the PRS is transmitted from some or all of DL CCs corresponding to the unlicensed bands. Information on DL CC configured to transmit PRS among DL CCs corresponding to the unlicensed bands may be signaled through a higher layer signal. Together with signaling of the information on DL CC, scrambling ID required when PRS sequence is generated, antenna port for transmitting PRS, CP (cyclic prefix), a position of transmission resource for transmitting PRS, etc. may be configured for each DL CC corresponding to the unlicensed band, through which the PRS may be transmitted. The scrambling ID required to generate the PRS sequence which will be transmitted from the unlicensed band may be set to physical cell ID or previously defined (or configured through higher layer signal, etc.) individual cell ID (for example, virtual cell ID, etc.).

Second Alternative

It is checked whether a current channel status of the UCell is busy or idle, through CS (carrier sensing). If it is determined that the current channel status is idle, the eNB may transmit a scheduling grant through (E)PDCCH of the LCell (that is CCS) or PDCCH of the UCell and attempt data transmission and reception. At this time, RRP of M consecutive SFs may be configured. A plurality of specific SFs (or single SF) of subframes within the RRP may be set to SF(s) for transmitting the PRS. Information on SF for transmitting the PRS may be signaled through a control channel or higher layer signal. As an example of signaling, relative subframe offset within the RRP and burst length information may be signaled.

Alternatively, regardless of RRP configuration, PRS transmission subframe of the unlicensed band may be configured to have a period or offset value for a specific subframe timing.

For another example, information on subframe for transmitting the PRS may not be provided to the UE, and subframe for transmitting the PRS in the unlicensed band may previously be defined. That is, period and offset of subframe for transmitting the PRS may be configured for a specific DL CC (for example, PCell) of the licensed band, and a PRS transmission subframe for some (or all) of DL CCs corresponding to the unlicensed band may be configured implicitly in accordance with period and offset configuration of the PRS transmission subframe for the specific DL CC. For example, it is assumed that CA between the PCell operating in the existing licensed band and the SCell operating in accordance with the LTE-U mode is configured and the subframe for transmitting the PRS in the PCell is set to SF#n. In this case, if SF#n (or previously scheduled subframe such as SF#(n+k) and SF#(n=k)) corresponds to the RRP in the SCell corresponding to the unlicensed band, the SF#n may be set to the subframe for transmitting the PRS.

Third Alternative

Transmission period and offset of subframe for transmitting the PRS may be configured for DL CC corresponding to the unlicensed band independently from PRS transmission period and offset of DL CC corresponding to the licensed band.

Fourth Alternative

PRS transmission in the unlicensed band may be configured only in case of the request of the UE. For example, if the UE determines that accuracy of position related measurement for a specific eNB is too low, the UE may transmit a request signal for requesting PRS transmission in the unlicensed band to the corresponding eNB.

Fifth Alternative

PRS transmission interval to the unlicensed band may be too long due to a channel status in view of operation characteristic of the unlicensed band. In this case, a combining (for example, averaging) window size for a positioning related measurement result of the UE may be too great. This may reduce accuracy of positioning related measurement. Therefore, in an environment that eNB(s) transmit(s) the PRS and the UE performs positioning related measurement by using the PRS, a positioning related measurement window may be set in a unit of a certain time (for example, N subframes or N positioning occasions) and then may be indicated to the UE. The measurement window may be set differently in a unit of a single DL CC (or a plurality of DL CCs) within the unlicensed band. Alternatively, one measurement window may be set for PRS transmission in all DL CCs within the unlicensed band. Similarly, the measurement window may be set differently in a unit of a single DL CC (or a plurality of DL CCs) within the licensed band, or one measurement window may be set for all DL CCs within the licensed band. The measurement window may be set independently differently (or commonly) for PRS transmission of the licensed band and the unlicensed band.

Sixth Alternative

If cell ID, $n_s$ (scrambling identity), etc. are required for PRS sequence generation like the existing PRS, $n_s$ parameter which will be used for PRS sequence generation transmitted in the unlicensed band may be set to follow $n_s$ of a specific DL CC (for example, PCell) of the licensed band of the corresponding timing point. Alternatively, $n_s$ used absolutely in the unlicensed band may be applied and used for PRS sequence generation. Alternatively, a start point of the RRP may be defined as $n_s=0$, and therefore $n_s$ may be set.

Seventh Alternative

The UE may be configured to calculate and report a positioning related estimation value (for example, RSTD) by measuring specific CSI-RS (channel state information-reference signal) for DL CC corresponding to the unlicensed band. If the UE performs positioning related measurement in the unlicensed band using the CSI-RS instead of the PRS, among subframes designated as the RRP, subframe for which the PRS is transmitted is designated, and data transmission loss occurring when PDSCH is not transmitted at the corresponding subframe may be avoided.

To this end, configurations for positioning of the UE include CSI-RS configuration. Specifically, configuration information such as CSI-RS IE may be included in OTDOA-ReferenceCellInfo and OTDOA-NeighbourCellInfo. If configuration information such as CSI-RS IE is included in the configurations for positioning, the UE may be configured to perform positioning related measurement from the corresponding CSI-RS.

As examples of the CSI-RS IE, some or all of the following information may be included and then configured for the UE.

DL CC information (corresponding to the unlicensed band) to which CSI-RS is transmitted Bandwidth size to which CSI-RS is transmitted Subframe information (period/offset) to which CSI-RS is transmitted Antenna port to which CSI-RS is transmitted Resource region information to which CSI-RS is transmitted Scrambling ID information of CSI-RS Information of CRS that enables QCL (quasi co-located) assumption with CSI-RS (scrambling ID of CRS, antenna port, MBSFN subframe information)

Eighth Alternative

For UL CC corresponding to the unlicensed band, the UE may be configured to transmit a UL signal such as a sounding reference signal (SRS), and the eNB within the network or a unit intended for position estimation/measurement may be configured to measure the UL signal and use the UL signal for position estimation. Since it may not be preferable that only a periodic SRS is used for measurement for positioning due to aperiodic/discontinuous transmission occasion characteristic in the unlicensed band, it is suggested to perform positioning related measurement from the aperiodic SRS in the unlicensed band.

A specific state of SRS request may previously be defined and scheduled to trigger SRS transmission for positioning in the unlicensed band or may be indicated to the UE by a physical/higher layer signal. Alternatively, a specific state within UL grant DCI including SRS request in the unlicensed band may previously be defined and scheduled to trigger SRS transmission or may be indicated to the UE by a physical/higher layer signal. If aperiodic SRS transmission of the unlicensed band is triggered as above, the UE performs CCA in the corresponding unlicensed band and then transmits the SRS for positioning at the RRP determined as being idle, and the eNB within the network or the unit intended for position estimation/measurement may perform positioning related measurement (for example, UL relative time of arrival) by using the SRS. Alternatively, if aperiodic SRS transmission of the unlicensed band is triggered, the UE may transmit the SRS for positioning at the RRP reserved after CCA as much as previously scheduled or signaled number of times, and the eNB within the network or the unit intended for position estimation/measurement may perform positioning related measurement (for example, UL relative time of arrival) by using the SRS. At this time, to configure aperiodic SRS for positioning in the unlicensed band, SRS transmission related configuration separately from SRS transmission related configuration in the existing licensed band may be provided to the UE or some of SRS transmission related parameters in the licensed band may only be provided separately for the aperiodic SRS for positioning.

Ninth Alternative

Independently from PRS transmission related parameters of DL CC corresponding to the licensed band, all or some of PRS transmission related parameters may be configured for DL CC corresponding to the unlicensed band. In other words, to transmit a pilot signal for measurement for positioning in the unlicensed band, all or some of information such as subframe index corresponding to a transmission time period or period/offset/burst length for indicating the subframe index, CP length, antenna port, scrambling ID (for example, physical cell ID) required for sequence generation, frequency band to be transmitted, and RE mapping may be provided to the UE through signaling. Alternatively, in the same manner as configuration for transmission of a pilot signal for measurement for positioning in the licensed band, the pilot signal may previously be scheduled to be transmitted in the unlicensed band, and only information which is not the same may be signaled. At this time, the information may be provided independently per eNB/TP.

Alternatively, in case of configuration for the unlicensed band in a cell co-located with a cell transmitted in the licensed band, configuration related to pilot signal transmission for measurement for positioning in the licensed band and the unlicensed band may be restricted to be configured equally. Alternatively, in case of configuration for the unlicensed band in a cell which is not co-located with a cell transmitted in the licensed band, configuration related to pilot signal transmission for measurement for positioning in the licensed band and the unlicensed band may be restricted to be always configured independently.

Alternatively, configuration related to pilot signal transmission for measurement for positioning in the unlicensed band may be restricted to be always configured independently from configuration related to pilot signal transmission for measurement for positioning in the licensed band regardless of co-location.

Figure 9:
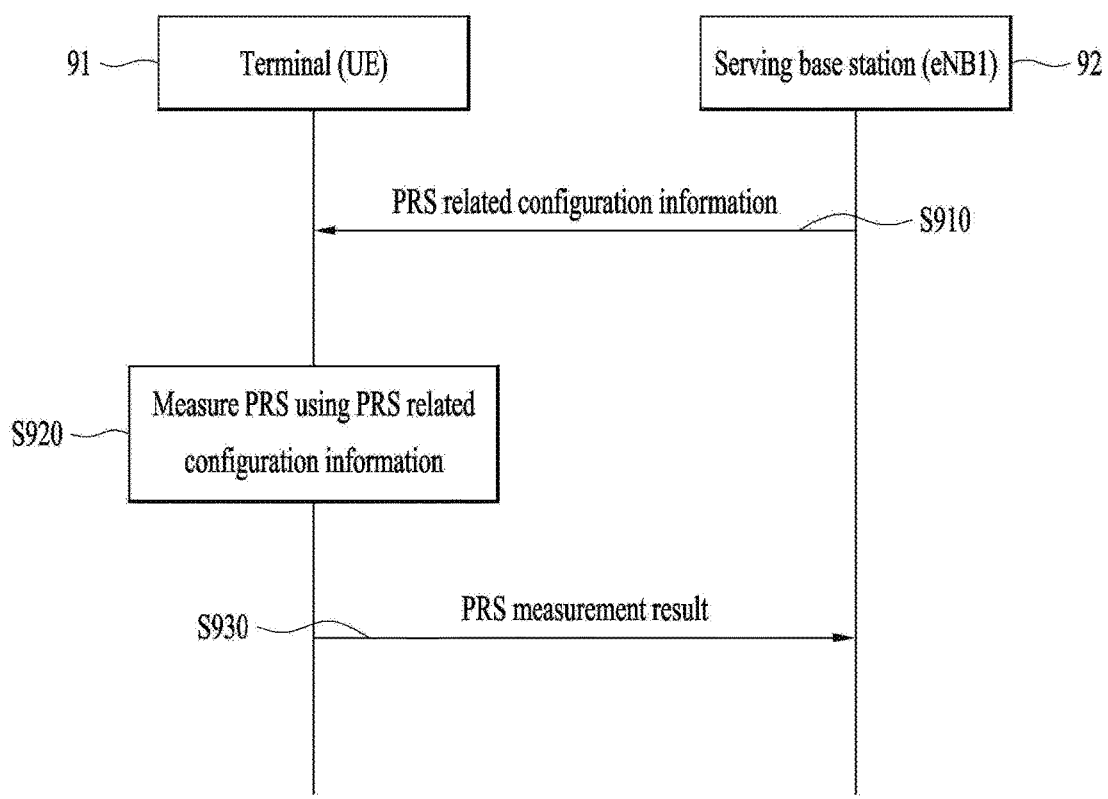
FIG. 9 is a diagram illustrating an operation according to one embodiment of the present invention.

FIG. 9 is a diagram illustrating an operation according to one embodiment of the present invention.

FIG. 9 relates to a method for receiving a reference signal for positioning in a wireless communication system.

A terminal 91 may receive PRS (positioning reference signal) related configuration information transmitted from one or more unlicensed band cells (S910). The PRS related configuration information may include information on a subframe at which the PRS is transmitted. The terminal may receive and measure the PRS by using the PRS related configuration information (S920). Then, the terminal may report the measured result of the PRS to a serving base station (S930).

The information on a subframe at which the PRS is transmitted may include information indicating at least one subframe which belongs to a resource period obtained in the corresponding unlicensed band cell.

Also, the information on a subframe at which the PRS is transmitted may include information indicating a period or offset value of a specific subframe.

Also, the information on a subframe at which the PRS is transmitted may include information indicating a period or offset value of a subframe of a licensed band cell to which the PRS is transmitted.

Also, the PRS may be transmitted from the subframe which belongs to the resource period obtained in the corresponding unlicensed band cell, among the indicated subframes.

The terminal may transmit a PRS transmission request through the one or more unlicensed band cells to the serving base station.

Also, the PRS related configuration information may include information on a measurement window related to the PRS through the one or more unlicensed band cells. The information on the measurement window may be configured differently in a unit of each unlicensed band cell or a plurality of unlicensed band cells.

Also, the PRS related configuration information may include information on an unlicensed band cell to which the PRS is transmitted.

The terminal may receive a transmission trigger of an aperiodic uplink reference signal for positioning in one or more unlicensed band cells from the serving base station. If the trigger is received, the terminal may perform channel sensing in the one or more unlicensed band cells and transmit the aperiodic uplink reference signal for a resource period obtained through channel sensing.

The terminal may receive transmission related configuration of the aperiodic uplink reference signal from the serving base station.

Although the embodiments according to the present invention have been described in brief with reference to FIG. 9, the embodiment related to FIG. 9 may include at least a part of the aforementioned embodiment(s) alternatively or additionally.

Figure 10:
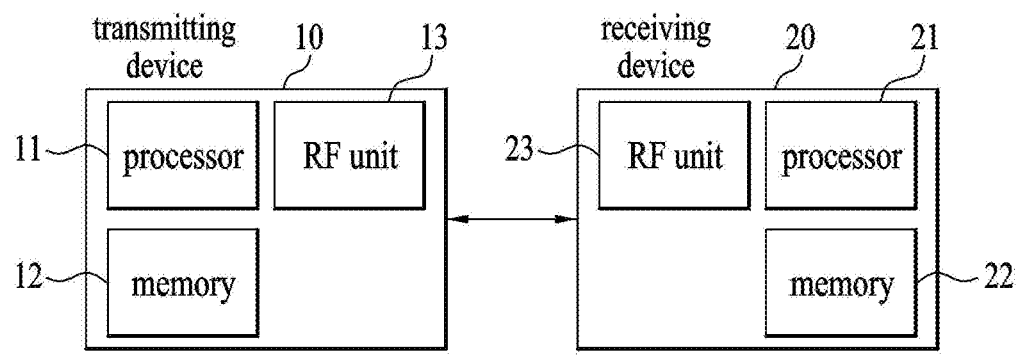
FIG. 10 is a block diagram illustrating an apparatus for implementing the embodiment(s) of the present invention.

FIG. 10 is a block diagram illustrating a transmitter 10 and a receiver 20 configured to implement embodiments of the present invention. Each of the transmitter 10 and receiver 20 includes a radio frequency (RF) unit 13, 23 capable of transmitting or receiving a radio signal that carries information and/or data, a signal, a message, etc., a memory 12, 22 configured to store various kinds of information related to communication with a wireless communication system, and a processor 11, 21 operatively connected to elements such as the RF unit 13, 23 and the memory 12, 22 to control the memory 12, 22 and/or the RF unit 13, 23 to allow the device to implement at least one of the embodiments of the present invention described above.

The memory 12, 22 may store a program for processing and controlling the processor 11, 21, and temporarily store input/output information. The memory 12, 22 may also be utilized as a buffer. The processor 11, 21 controls overall operations of various modules in the transmitter or the receiver. Particularly, the processor 11, 21 may perform various control functions for implementation of the present invention. The processors 11 and 21 may be referred to as controllers, microcontrollers, microprocessors, microcomputers, or the like. The processors 11 and 21 may be achieved by hardware, firmware, software, or a combination thereof. In a hardware configuration for an embodiment of the present invention, the processor 11, 21 may be provided with application specific integrated circuits (ASICs) or digital signal processors (DSPs), digital signal processing devices (DSPDs), programmable logic devices (PLDs), and field programmable gate arrays (FPGAs) that are configured to implement the present invention. In the case which the present invention is implemented using firmware or software, the firmware or software may be provided with a module, a procedure, a function, or the like which performs the functions or operations of the present invention. The firmware or software configured to implement the present invention may be provided in the processor 11, 21 or stored in the memory 12, 22 to be driven by the processor 11, 21.

The processor 11 of the transmitter 10 performs predetermined coding and modulation of a signal and/or data scheduled by the processor 11 or a scheduler connected to the processor 11, and then transmits a signal and/or data to the RF unit 13. For example, the processor 11 converts a data sequence to be transmitted into K layers through demultiplexing and channel coding, scrambling, and modulation. The coded data sequence is referred to as a codeword, and is equivalent to a transport block which is a data block provided by the MAC layer. One transport block is coded as one codeword, and each codeword is transmitted to the receiver in the form of one or more layers. To perform frequency-up transformation, the RF unit 13 may include an oscillator. The RF unit 13 may include Nt transmit antennas (wherein Nt is a positive integer greater than or equal to 1).

The signal processing procedure in the receiver 20 is configured as a reverse procedure of the signal processing procedure in the transmitter 10. The RF unit 23 of the receiver 20 receives a radio signal transmitted from the transmitter 10 under control of the processor 21. The RF unit 23 may include Nr receive antennas, and retrieves baseband signals by frequency down-converting the signals received through the receive antennas. The RF unit 23 may include an oscillator to perform frequency down-converting. The processor 21 may perform decoding and demodulation on the radio signal received through the receive antennas, thereby retrieving data that the transmitter 10 has originally intended to transmit.

The RF unit 13, 23 includes one or more antennas. According to an embodiment of the present invention, the antennas function to transmit signals processed by the RF unit 13, 23 are to receive radio signals and deliver the same to the RF unit 13, 23. The antennas are also called antenna ports. Each antenna may correspond to one physical antenna or be configured by a combination of two or more physical antenna elements. A signal transmitted through each antenna cannot be decomposed by the receiver 20 anymore. A reference signal (RS) transmitted in accordance with a corresponding antenna defines an antenna from the perspective of the receiver 20, enables the receiver 20 to perform channel estimation on the antenna irrespective of whether the channel is a single radio channel from one physical antenna or a composite channel from a plurality of physical antenna elements including the antenna. That is, an antenna is defined such that a channel for delivering a symbol on the antenna is derived from a channel for delivering another symbol on the same antenna. An RF unit supporting the Multiple-Input Multiple-Output (MIMO) for transmitting and receiving data using a plurality of antennas may be connected to two or more antennas.

In embodiments of the present invention, the UE operates as the transmitter 10 on uplink, and operates as the receiver 20 on downlink. In embodiments of the present invention, the eNB operates as the receiver 20 on uplink, and operates as the transmitter 10 on downlink.

The transmitter and/or receiver may be implemented by one or more embodiments of the present invention among the embodiments described above.

Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention defined in the appended claims. Thus, the present invention is not intended to be limited to the embodiments described herein, but is intended to have the widest scope consistent with the principles and novel features disclosed herein.

INDUSTRIAL APPLICABILITY

The present invention is applicable to wireless communication devices such as a terminal, a relay, and a base station.

The invention claimed is:

1. A method for receiving a reference signal for positioning through one or more unlicensed band cells in a wireless communication system, the method being carried out by a terminal and comprising:
receiving positioning reference signal (PRS) related configuration information transmitted through the one or more unlicensed band cells, the PRS related configuration information including information on a subframe in which the PRS is transmitted, and information on a measurement window related to the PRS through the one or more unlicensed band cells;
receiving and measuring the PRS by using the PRS related configuration information; and
reporting a measurement result of the PRS to a serving base station,
wherein the information on the measurement window is configured differently in a unit of each unlicensed band cell or in a unit of a plurality of unlicensed band cells.

2. The method according to claim 1, wherein the information on a subframe in which the PRS is transmitted indicates at least one subframe which belongs to a resource period obtained in a corresponding unlicensed band cell.

3. The method according to claim 1, wherein the information on a subframe in which the PRS is transmitted indicates a period or a offset value of a specific subframe.

4. The method according to claim 1, wherein the information on a subframe in which the PRS is transmitted indicates a period or a offset value of a subframe of a licensed band cell to which the PRS is transmitted.

5. The method according to claim 4, wherein the PRS is transmitted in the subframe which belongs to a resource period obtained in a corresponding unlicensed band cell, among the indicated subframes.

6. The method according to claim 1, further comprising transmitting a PRS transmission request through the one or more unlicensed band cells to the serving base station.

7. The method according to claim 1, wherein the PRS related configuration information includes information on an unlicensed band cell to which the PRS is transmitted.

8. The method according to claim 1, further comprising receiving a trigger of a transmission of an aperiodic uplink reference signal for positioning in one or more unlicensed band cells from the serving base station.

9. The method according to claim 8, further comprising: wherein the receiving a transmission trigger includes:

performing channel sensing in the one or more unlicensed band cells when the trigger is received; and transmitting the aperiodic uplink reference signal for a resource period obtained through the channel sensing.

10. The method according to claim 8, further comprising receiving transmission related configuration of the aperiodic uplink reference signal from the serving base station.

11. A terminal configured to receive a positioning reference signal through one or more unlicensed band cells in a wireless communication system, the UE comprising:
   a receiver and a transmitter; and
   a processor that controls the receiver and the transmitter,
   wherein the processor receives positioning reference signal (PRS) related configuration information transmitted through the one or more unlicensed band cells, the PRS related configuration information including information on a subframe in which the PRS is transmitted and information on a measurement window related to the PRS through the one or more unlicensed band cells, receives and measures the PRS by using the PRS related configuration information, and report a measurement result of the PRS to a serving base station,
   wherein the information on the measurement window is configured differently in a unit of each unlicensed band cell or in a unit of a plurality of unlicensed band cells.

* * * * *